United States Patent [19]

Henault et al.

[11] Patent Number: 4,677,939
[45] Date of Patent: Jul. 7, 1987

[54] HEAT EXCHANGER AND APPLICATION TO A FLUID HEATING APPARATUS, PARTICULARLY A DOMESTIC HOT WATER ACCUMULATOR

[75] Inventors: Jean-Paul Henault, Bourseville; Albert Drapier, Saint Maur; Guy Grochowski, Deuil la Barre; Alain Meslif, Luzarches, all of France

[73] Assignees: Gaz de France; Societe Industrielle Auer S.A., both of France

[21] Appl. No.: 820,988

[22] Filed: Jan. 21, 1986

[30] Foreign Application Priority Data

Jan. 21, 1985 [FR] France .................. 85 00803

[51] Int. Cl.⁴ .............................. F22B 5/00
[52] U.S. Cl. ................. 122/17; 29/157.3 AH; 29/157.4; 122/134; 122/182 S; 126/362
[58] Field of Search ........ 122/17, 134, 182 S, 122/32, 161; 126/362, 350 R, 360 R, 391; 29/157.3 AH, 157.4

[56] References Cited

U.S. PATENT DOCUMENTS

| | | | |
|---|---|---|---|
| 2,147,046 | 2/1939 | Leoni | 122/134 |
| 2,651,294 | 9/1953 | Horne | 122/134 |
| 4,065,264 | 12/1977 | Lewin . | |
| 4,138,288 | 2/1979 | Lewin . | |
| 4,138,464 | 2/1979 | Lewin . | |
| 4,282,180 | 8/1981 | Raible . | |
| 4,492,185 | 1/1985 | Kendall et al. | 122/17 X |
| 4,541,410 | 9/1985 | Jatana | 126/362 |

FOREIGN PATENT DOCUMENTS 2719171 12/1977 Fed. Rep. of Germany .
2479956 10/1981 France .

Primary Examiner—Edward G. Favors
Attorney, Agent, or Firm—Willian Brinks Olds Hofer Gilson & Lione Ltd.

[57] ABSTRACT

The apparatus for heating a fluid comprises a heating enclosure supplied in its lower part with fluid to be heated, a combustion chamber comprising a burner at one of its ends and extending on the side opposite the burner inside the enclosure, a fume circulation tube disposed inside the enclosure to constitute a contra-flow heat exchanger, which tube is hermetically connected to the outlet of the combustion chamber and opens out in a fume evacuation device located in the lower part of the enclosure in order to evacuate the fumes to outside the heating apparatus, and means for taking heated fluid in the upper part of the enclosure. The heat exchanger tube is constituted by an originally flexible, tight, ringed metal tube, disposed spirally substantially in the lower third of the enclosure, and so that the different turns of the ringed tube are tangentially in contact with one another in order to form a compact exchanger.

11 Claims, 4 Drawing Figures

100 # HEAT EXCHANGER AND APPLICATION TO A FLUID HEATING APPARATUS, PARTICULARLY A DOMESTIC HOT WATER ACCUMULATOR

The present invention relates to a heat exchanger for fluid heating apparatus, comprising a circuit of forced circulation of combustion products and a circuit of natural or forced circulation of a fluid to be heated.

The invention also relates to an apparatus for heating a fluid, particularly a domestic hot water accumulator, comprising a heating enclosure supplied in its lower part with fluid to be heated, a combustion chamber comprising a burner at one of its ends and extending on the side opposite the burner inside the enclosure, a fume circulation tube disposed inside the enclosure to constitute a contra-flow heat exchanger, which tube is hermetically connected to the outlet of the combustion chamber and opens out in a fume evacuation device located in the lower part of the enclosure in order to evacuate the fumes to outside the heating apparatus, and means for taking heated fluid in the upper part of the enclosure.

Apparatus of this type for heating a liquid are known, which comprise, inside a heating enclosure traversed by the liquid to be heated, a tubular combustion chamber opening in a fume tube constituted by a pipe coil helically wound in descending turns about the combustion chamber to create a heat exchange between the liquid to be heated present in the enclosure and the fumes which circulate inside the pipe coil immersed in the enclosure. In such a type of gas-fired heating apparatus, the fumes produced in the combustion chamber at the level of the burner are introduced in the coil-shaped fume tube in the upper part thereof which is adjacent the upper part of the enclosure, and circulate downwardly in contra-flow with respect to the ascending movement of the liquid which is heated in the enclosure. This arrangement makes it possible to obtain a fairly good yield which may be further increased by recovering the latent heat of evaporation of the water vapour produced by the combustion. However, the yield of such apparatus is not yet optimum.

Moreover, known heating apparatus of this type use heat exchangers constituted by rigid smooth steel tubes which occupy the major part of the free space inside the heating enclosure filled with liquid and require relatively long and delicate shaping operations to lead to the form of a coil.

It is thus one object of the present invention to improve the coefficient of exchange, the exchange surface per linear meter of tube and consequently the yield of the known fluid heating apparatus.

A further object of the invention is to ensure good homogenization of the temperature of the heated fluid and to increase the capacity of tappable heated fluid at a temperature fixed by the regulation reference value.

Yet another object of the invention is to facilitate and render more rapid and less expensive the installation of a heat exchanger inside the enclosure of a fluid heating apparatus with accumulation and condensation.

These objects are attained thanks to a heat exchanger of the type mentioned hereinabove which, according to the invention, comprises an originally flexible, tight, ringed metal tube immersed in the fluid to be heated and defining a series of contiguous loops or turns.

The flexible ringed tube may be wound around a rigid support in order to define said series of contiguous loops or turns.

According to a particular embodiment, the originally flexible, tight, ringed metal tube is rigidified by inflation after having been wound to define said series of contiguous loops or turns.

In accordance with the invention, a fluid heating apparatus of the type mentioned at the beginning of the present specification is characterized in that the heat exchanger tube is constituted by an originally flexible, tight, ringed metal tube, in that the ringed tube is disposed spirally substantially in the lower third of the enclosure, and in that the different turns of the ringed tube are tangentially in contact with one another in order to form a compact exchanger.

The flexible ringed tube may advantageously be wound around a rigid support constituted by a cylindrical surface surrounding that part of the combustion chamber located inside the enclosure. After having been wound spirally, the originally flexible, tight, ringed tube may be rigidified by inflation.

The ringed tube is fixed by welding on the one hand on the combustion chamber in the upper part of the exchanger, on the other hand on the housing of the fume evacuator device, in the lower part of the exchanger.

The heat exchanger is generally of the helicoidal contra-flow type, the fluid in the enclosure exchanging heat by natural convection, and the exchanger is located in a temperature zone of the fluid to be heated which is very largely lower than the dew point temperature of the combustion products.

According to a particular embodiment, adapted to a liquid accumulator with a volume of about 80 liters, to obtain liquid at a temperature close to 65° C., the heat exchanger comprises a ringed tube presenting a length of between about 2 and 4 m, a mean diameter of between about 30 and 50 mm, a depth of fluting of the order of 5 mm, and a turn diameter of the order of 25 to 35 cm.

A domestic hot water heating apparatus according to the invention makes it possible, in particular, to obtain at the outlet fumes at a temperature of the order of 19° or 20° C. if the cold water introduced in the lower part of the enclosure is at a temperature of about 15° C. Consequently, the formation of a wreath of vapour leaving the fume conduit is avoided.

The invention will be more readily understood on reading the following description with reference to the accompanying drawings, in which.

Figure 1:
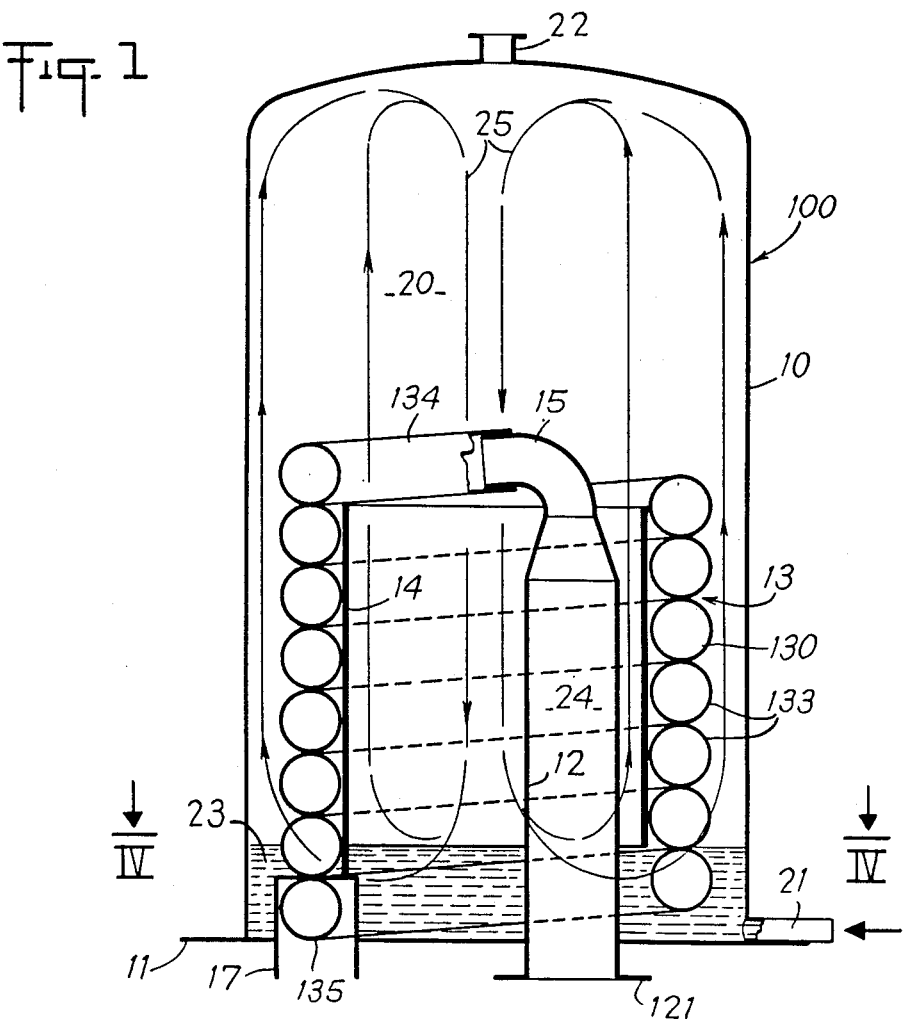
FIG. 1 is a schematic view in axial section of a heating apparatus according to the invention.

Referring now to the drawings, FIG. 1 shows a domestic hot water generator 100 with accumulation and condensation, comprising an enclosure 10 which rests on a base 11.

A conduit 21 opens out inside the enclosure 10, in the lower part thereof, for the introduction of cold water. A conduit 22 disposed at the level of the upper part of the accumulation tank 100 taps heated water, for example at a temperature of the order of 65° C.

A contra-flow heat exchanger 13 is disposed inside the enclosure 10, in the lower part thereof, leaving free in the upper part of the enclosure a volume corresponding to about two thirds of the total capacity of the enclosure 10.

The heat exchanger 13 is constituted by a flexible ringed tube 130 made of stainless steel helically wound in the annular zone of the tank 100 which is located around a vertical tubular combustion chamber 12. The vertical tubular combustion chamber 12 which penetrates inside the enclosure 10 is located above a gas burner (not shown) which is supplied with combustible gas and with combustion-supporting air to produce combustion products 24 at high temperature which escape from the combustion chamber 12, in the upper part thereof, via hermetic curved connecting conduits 15, to penetrate at the upper end 134 of the ringed tube 130 of the exchanger 13. The lower end 135 of the ringed tube 130 itself opens into a fume box 17, which comprises a nozzle (not shown) in order to evacuate outside the heating apparatus 100, for example towards a flue conduit, the fumes cooled in the exchanger 13. The heat transfers are effected by natural convection within the water 20 in the enclosure 10 around the exchanger 13, and by forced convection within the fumes 24 found in combustion chamber 12 or exchanger 13, the gaseous products being set in motion by the ventilator of the burner disposed in the lower part of combustion chamber 12, at the inlet thereof. An extractor fan may, however, also be placed at the outlet of exchanger 13, at the level of fume box 17.

Figure 2:
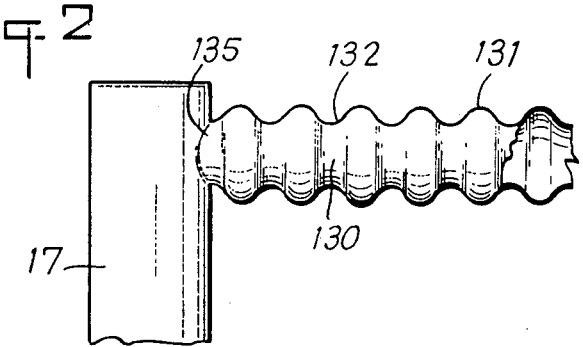
FIG. 2 is a side view of the outlet end of the heat exchanger used in the apparatus of FIG. 1.

A particular feature of the invention resides in the use of a heat exchanger 13 constituted by a flexible ringed metal tube 130 whose wall presents, viewed in axial section (FIG. 2), a succession of crests 131 separated by troughs 132. The profile of the wall of the ringed tube 130, seen in axial section, may thus for example be of substantially sinusoidal form. In general, the inner face of the ringed tube 130 is not smooth in the longitudinal direction and presents irregularities, protuberances or roughness. On the fume 24 side, exchange by forced convection may thus be considerable due to the high rate of turbulence created by the considerable inner roughness of the ringed tube and the uneven path of the gaseous fluid. In addition, the ringed nature of tube 130 gives it a considerable suppleness whilst conserving good mechanical strength and enabling it to be disposed compactly. The different turns 133 of the helicoidal exchanger 13 may thus be superposed on one another and be tangentially in contact with one another. The corrugated shape of the outer face of the ringed tube 130, in the longitudinal direction of this tube, makes it possible to reserve spaces 20 for circulation of fluid between two adjacent turns 130 and thus ensures a considerable heat exchange despite the compactness of the exchanger 13. The ringed tube presents an exchange surface per meter of tube largely greater than that of a smooth tube (ratio of about 1 to 3).

Figure 3:
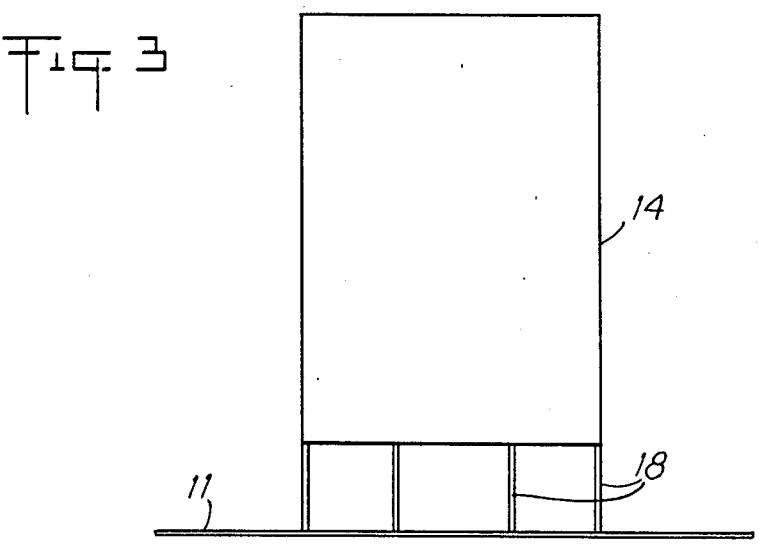
FIG. 3 is a schematic view in elevation of an embodiment of support of the heat exchanger used in the apparatus of FIG. 1.
Figure 4:
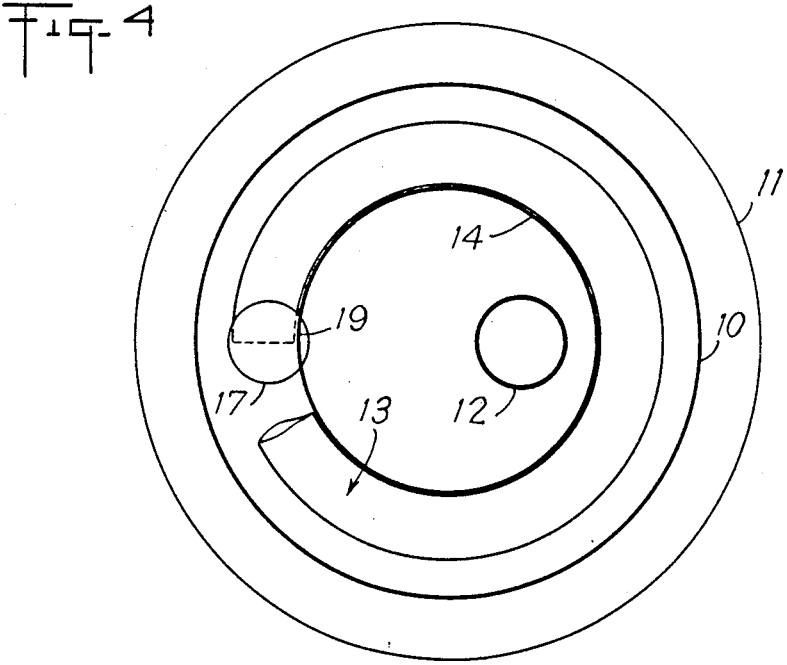
FIG. 4 is a schematic view in section along plane IV—IV of FIG. 1.

The ringed tube 130 may present a relatively small wall thickness due to the mechanical rigidity provided by crests 131, this giving a sufficient suppleness to allow the tube 130 to be shaped spirally in simple manner without a shaping process. In fact, the flexible ringed tube 130 is simply wound around a rigid support 14 constituted for example by a cylindrical wall forming skirt, whose height corresponds at least approximately to that of the exchanger 13 and which is fixed, for example via an underframe 18, on the lower part 11 forming the base of the enclosure 10 (FIGS. 1 and 3). The cylindrical support 14 which may be formed by a simple wound metal sheet is disposed around the combustion chamber 12 which is not necessarily coaxial to the support 14 (FIG. 4). The ringed tube 130 wound around the cylindrical support 14 is rendered fast, for example by welding, on the one hand with the upper part of the combustion chamber 12 (connection 15 of FIGS. 1 and 4), and on the other hand, in the vicinity of base 11, with the fume box 17 (connection 19 of FIG. 4).

It will be noted that the one-piece structure constituted by the exchanger 13, the combustion chamber 12, the lower base 11 and the support 14, allows simple assembly and dismantling via the bottom of the accumulator. Such a solution avoids all the problems of drilling and welding on the side face of the enclosure 10.

According to a particular embodiment, the flexible ringed tube 130 is firstly shaped spirally around a support such as support 14 in FIGS. 1, 3 and 4. A pressurized fluid such as water is then made to circulate for a limited duration inside the ringed tube 130 in order to provoke a slight deformation thereof and rigidify it. It is then possible to withdraw the support 14, the rigidified tube 130 being able to rest directly and in stable manner on the base 11.

As indicated hereinabove, the use of a ringed tube 130 increases the overall exchange coefficient with respect to that obtained with a smooth tube and reduces, with equal surface, the length of the tube used. The exchange surface may therefore be reduced for the same power to be evacuated, this leading to a reduction in the length of tube 130 and in the dead volume occupied by exchanger 13.

Furthermore, the presence of a metal sheet 14 cylindrically wound inside the pipe coil 13 as well as the downward collection of the exchanger increase the mixed volume in the liquid 20 by the convection currents (arrows 25 of FIG. 1) and increase the homogenization and capacity of tappable water at a predetermined heating temperature, for example 65° C. The compact heater 13 is entirely disposed in the lower part of the accumulation tank 100. This avoids too great an overheating of the water at the outlet nozzle 22 of tank 100.

As may be seen in FIG. 1, the convection circuit 25 does not descend as far as the bottom point of enclosure 10 and the lower turns of exchanger 13 are immersed in water 23 at a temperature much lower than the dew point temperature of the combustion products 24. This condition is thus ideal for condensing the water vapour contained in the combustion products.

In enclosure 10, the existence of the cold lower zone 23 and of the hot upper zone located above the exchanger 13 thus allow heat exchanges in condensation mode whilst optimalizing the quantity of hot water available in accumulator 100.

By way of example, with a heat exchanger 13 constituted by a ringed tube 130 whose length is 3.10 m, the maximum outer diameter is 50 mm, the minimum inner diameter is 38 mm, the depth of the crests 131 is at maximum 5 mm, and which is shaped helically, the turns presenting a diameter of 30 cm, there is created a total exchange surface of 1.2 m² and the power per m² is 10.9 kW with cold water at 14° C.

An accumulator 100 of 12 kW power containing a useful volume of 80 liters and intended for heating water to 65° C. from an initial temperature of the order of 14° C., makes it possible, with the heat exchanger mentioned above, to have a capacity of tappable water at 65° C. which constitutes 80% of the useful volume, and offers, with a flowrate of 5 liters/min. an overall yield of 109% net calorific value, corresponding to 98% gross calorific value.

Various modifications and additions may, of course, be made to the embodiment of the heating apparatus which has just been described.

The invention is more particularly applicable to domestic hot water accumulators, but also to central heating boilers and to various other apparatus for heating fluids other than water, by means of a heat exchange with combustion products circulating by forced circulation inside a heat exchanger constituted by a flexible, tight, ringed metal tube or possibly one which is rigidified by inflation after winding, immersed in the fluid to be heated and defining a series of loops or turns.

What is claimed is:

1. In an apparatus for heating a fluid, particularly a domestic hot water accumulator, comprising a heating enclosure supplied in its lower part with fluid to be heated, a combustion chamber comprising a burner at one of its ends and extending on the side opposite the burner inside the enclosure, a heat exchanger tube disposed inside the enclosure to constitute a contra-flow heat exchanger, which tube is hermetically connected to the outlet of the combustion chamber and opens out in a fume evacuation device located in the lower part of the enclosure in order to evacuate the fumes to outside the heating apparatus, and means for taking heated fluid in the upper part of the enclosure, the improvement wherein
    the heat exchanger tube comprises an originally flexible, tight, ringed metal tube;
    the ringed tube is disposed spirally substantially in the lower third of the enclosure,
    adjacent turns of the ringed tube are tangentially in contact with one another in order to form a compact exchanger; and
    the flexible ringed tube is wound around a rigid support which comprises a cylindrical surface surrounding that part of the combustion chamber located inside the enclosure.

2. The apparatus of claim 1, wherein the originally flexible, tight, ringed tube is rigidified by inflation after having been spirally wound around said rigid support.

3. The apparatus of claim 1, wherein the ringed tube is fixed by welding on the one hand on the combustion chamber in the upper part of the exchanger and on the other hand on the housing of the fume evacuator device in the lower part of the exchanger.

4. The apparatus of claim 1, wherein the heat exchanger is of the helicoidal contra-flow type, the fluid in the enclosure exchanging heat by natural convection, and the exchanger is located in a temperature zone of the fluid to be heated very largely lower than the dew point temperature of the combustion products.

5. The apparatus of claim 1, wherein the heat exchanger comprises a ringed tube presenting a length of between about 2 and 4 m, a mean diameter of between about 30 and 50 mm, a depth of fluting of the order of 5 mm, and a turn diameter of the order of 25 to 35 cm.

6. A heat exchanger for fluid heating apparatus, comprising a circuit of forced circulation of combustion products and a circuit of natural or forced circulation of a fluid to be heated, wherein it comprises an originally flexible, tight, ringed metal tube immersed in the fluid to be heated and defining a series of contiguous loops or turns, and the originally flexible, tight, ringed, metal tube is rigidified by inflation after having been wound around a rigid support to define said series of contiguous loops or turns.

7. The apparatus of claim 1, wherein the originally flexible, tight, ringed metal tube is wound spirally around the rigid support and pressurized with a fluid in order to promote a slight deformation in the tube, wherein the slight deformation rigidifies the spiralled tube.

8. The apparatus of claim 1, wherein the originally flexible, tight, ringed metal tube comprises an interior wall which defines a plurality of annular troughs and crests spaced along the length of the tube.

9. The apparatus of claim 6, wherein the originally flexible, tight, ringed metal tube comprises an interior wall which defines a plurality of annular troughs and crests spaced along the length of the tube.

10. The apparatus of claim 6, wherein the inflation promotes a slight deformation in the ringed, metal tube.

11. The apparatus of claim 1, wherein the apparatus is adapted for use as a water heater.

* * * * *